United States Patent
Sheets

(10) Patent No.: US 8,832,475 B1
(45) Date of Patent: Sep. 9, 2014

(54) PROGRAMMABLE POWER MODE SEQUENCER

(75) Inventor: Michael Sheets, Seattle, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 933 days.

(21) Appl. No.: 12/777,130

(22) Filed: May 10, 2010

Related U.S. Application Data

(60) Provisional application No. 61/176,935, filed on May 10, 2009.

(51) Int. Cl.
*G06F 1/26* (2006.01)
*G06F 1/32* (2006.01)

(52) U.S. Cl.
USPC ........... 713/310; 713/300; 713/320; 713/330; 712/228; 712/229; 718/108

(58) Field of Classification Search
CPC ............ G06F 1/3287; G06F 1/944505; G06F 12/0646; G06F 15/7867; H04L 41/0813
USPC .......... 713/300, 310, 320, 330; 712/228, 229; 718/108
See application file for complete search history.

(56) References Cited

U.S. PATENT DOCUMENTS

| | | | |
|---|---|---|---|
| 2004/0025063 A1* | 2/2004 | Riley | 713/300 |
| 2006/0053311 A1* | 3/2006 | Chary | 713/300 |
| 2006/0075283 A1* | 4/2006 | Hartung et al. | 714/5 |
| 2009/0077090 A1* | 3/2009 | Pacifici et al. | 707/10 |
| 2009/0083768 A1* | 3/2009 | Hatalkar et al. | 719/328 |
| 2010/0185835 A1* | 7/2010 | Leijten et al. | 712/208 |
| 2012/0131257 A1* | 5/2012 | Rudosky et al. | 711/5 |

\* cited by examiner

*Primary Examiner* — Michael J Brown

(57) ABSTRACT

A system includes a context file to store multiple contexts corresponding to different power modes of an electronic system, and a domain control device to generate control signals based, at least in part, on a context from the context file. The electronic system is configured to transition to a power mode corresponding to the context responsive to the control signals.

20 Claims, 6 Drawing Sheets

US 8,832,475 B1

PROGRAMMABLE POWER MODE SEQUENCER

RELATED APPLICATION

This patent application claims benefit of and priority to U.S. Provisional Patent Application No. 61/176,935, filed May 10, 2009, which is incorporated by reference herein.

TECHNICAL FIELD

This disclosure relates generally to electronic systems, and, more particularly, to a programmable power mode sequencer.

BACKGROUND

Systems often include electrical components that are operational when they receive power, e.g., in an active power mode, and are not-operational when the power supply is removed or cut-off. Many of these systems, to help reduce power consumption, implement one or more low power operational modes, such as a standby mode, a sleep mode, and/or a hibernate mode. When in a low power mode, the system can reduce or eliminate static and/or dynamic current leakage by electrical components of the system, but also have the ability to "wake-up" to an active mode in an ordered manner within a specified amount of time. Most of these systems include a finite state machine or other fixed-function circuitry to control the transition of the electrical components within the system between the power modes.

SUMMARY

The patent application describes a system including a context file to store multiple contexts corresponding to different power modes of an electronic system, and a domain control device to generate control signals based, at least in part, on a context from the context file. The electronic system is configured to transition to a power mode corresponding to the context responsive to the control signals.

A method includes selecting a programmable context from multiple programmable contexts that correspond to different power modes of an electronic system, determining a sequence for multiple operations to be performed by the electronic system in order for the electronic system to transition to a power mode corresponding to the selected programmable context, and directing the electronic system to perform the multiple operations in the determined sequence based on the selected programmable context.

Another system includes an electronic system having multiple operational power modes, and a power manager to select a programmable context corresponding to at least one of the multiple operational power modes and to direct the electronic system to convert to an operational power mode corresponding to the programmable context selected by the power manager.

DETAILED DESCRIPTION

A Programmable System-on-Chip (PSoC®), such as that used in the PSoC® family of products offered by Cypress Semiconductor Corporation (San Jose, Calif.), or other electronic system can include a power manager to control a power mode of electrical components in the programmable or electronic system. The power manager can include programmable contexts and programmable masks that allow the power manager to direct the electrical components to transition between various power modes through a series of sequential operations. Embodiments are shown and described below in greater detail.

Figure 1:
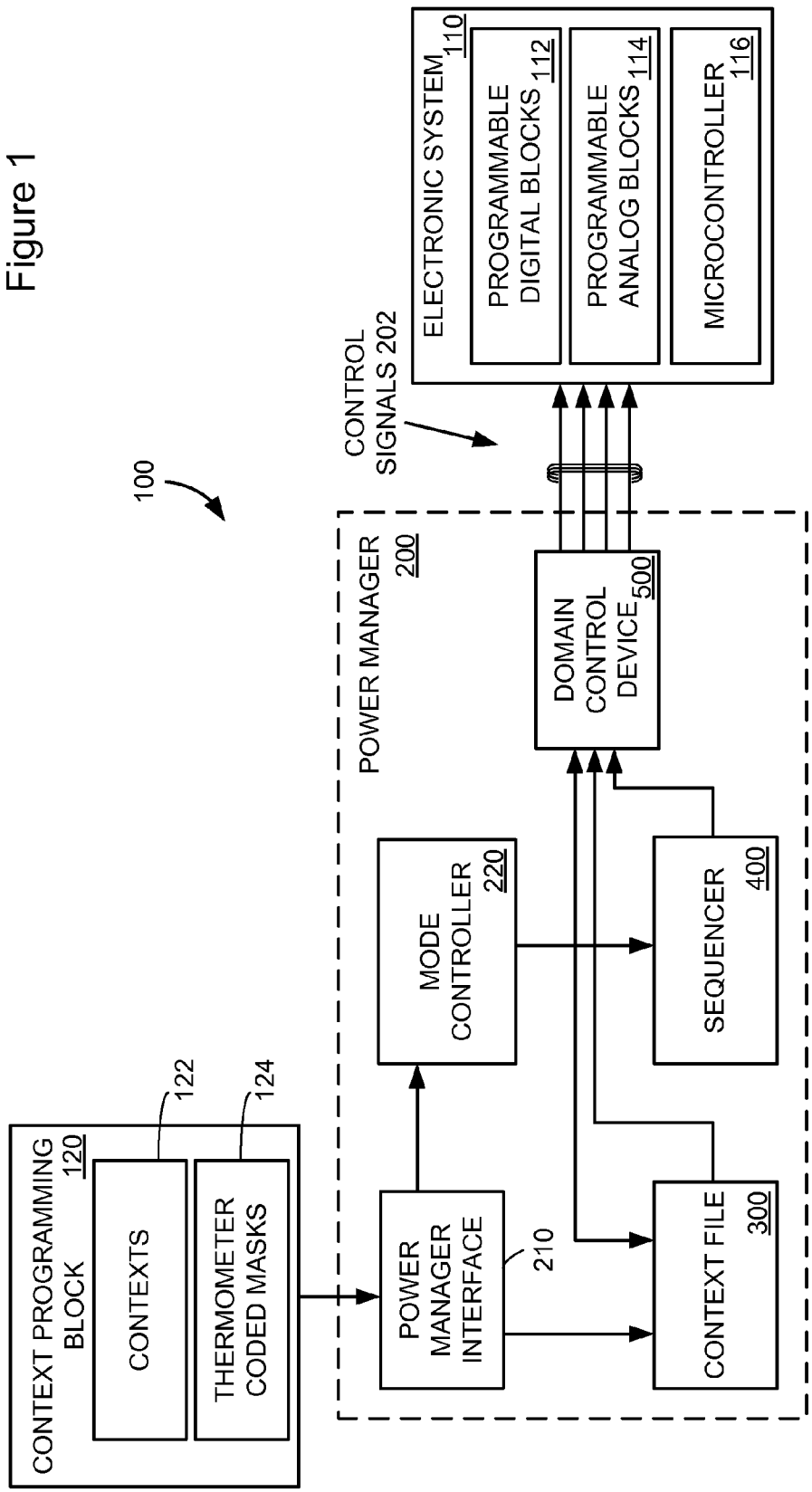
FIG. 1 shows a system that includes a power manager according to embodiments of the invention.

FIG. 1 shows a system 100 that includes a power manager 200 according to embodiments of the invention. Referring to FIG. 1, the system 100 includes an electronic system 110 having various electrical components or blocks, such as the programmable digital blocks 112, programmable analog blocks 114, and a microcontroller 116, that can perform various operations or tasks depending on their operational power mode. The electronic system 110, or subsystems and/or domains within the electronic system 110, can have various operational power modes, such as an active mode and a shutdown mode, as well as one or more low power modes, such as a standby mode, a sleep mode, and/or a hibernate mode. The low power modes can allow the electronic system 110 the ability to reduce power consumption compared to an active mode, while also allowing the electronic system 110 to wake-up or shutdown with different latencies for different modes.

Transitions between power modes can include multiple different sequential operations by the electronic system 110. For example, when a subsystem of the electronic system 110 transitions from an active mode to a low power mode, the subsystem can turn-off a clock signal or domain, electrically isolate the subsystem from the rest of the electronic system 110, retain data or state information of the subsystem, and power-down the power domain associated with the subsystem.

The system 100 includes a power manager 200 to generate control signals 202 that, when provided to the electronic system 110, prompt the electronic system 110 to transition between various power modes. In some embodiments, each of the control signals 202 can direct domains and/or subsystems in the electronic system 110 to perform at least one of the sequential operations for the power mode transition.

The power manager 200 includes a context file 300 to store multiple contexts, for example, that each corresponding to a discrete power mode. A mode controller 220 can prompt the context file 300 to select a stored context for transmission to the domain control device 500, and direct the domain control device 500 to generate the control signals 202 based on to the selected context. The mode controller 220 can direct a sequencer 400 to determine a sequence for the control signals 202, for example, with thermometer coded masks, and the domain control device 500 can provide the control signals 202 to the electronic system 110 in the sequence determined by the sequencer 400. Embodiments of the context file 300, sequencer 400, and domain control device 500 will be described below in greater detail.

The power manager 200 includes a power manager interface 210 to receive information, such as contexts 122 and thermometer coded masks 124 from a context programming block 120, which can program or reprogram the power manager 200. The power manager interface 210 can transfer the contexts 122 to the context file 300 for storage, and transfer the thermometer coded masks 124 to the sequencer 400, for example, via the mode controller 220. The programmability of the context file 300 and the sequencer 400 allows the power manager 200 to implement any number of power modes for the electronic system 110, and provides the system 100 the flexibility to modify the power modes at any time. In some embodiments, the power manager interface 210 can receive contexts and thermometer coded masks from other devices or systems, such as the microcontroller 116 in the electronic system 110 or an external device via an input/output (I/O) port (not shown) of the system 100. In some embodiments, the context file 300 can include one or more preset contexts having constant values, and the sequencer 400 can include one or more preset thermometer coded masks and/or delay values for use in sequencing operations.

Figure 2:
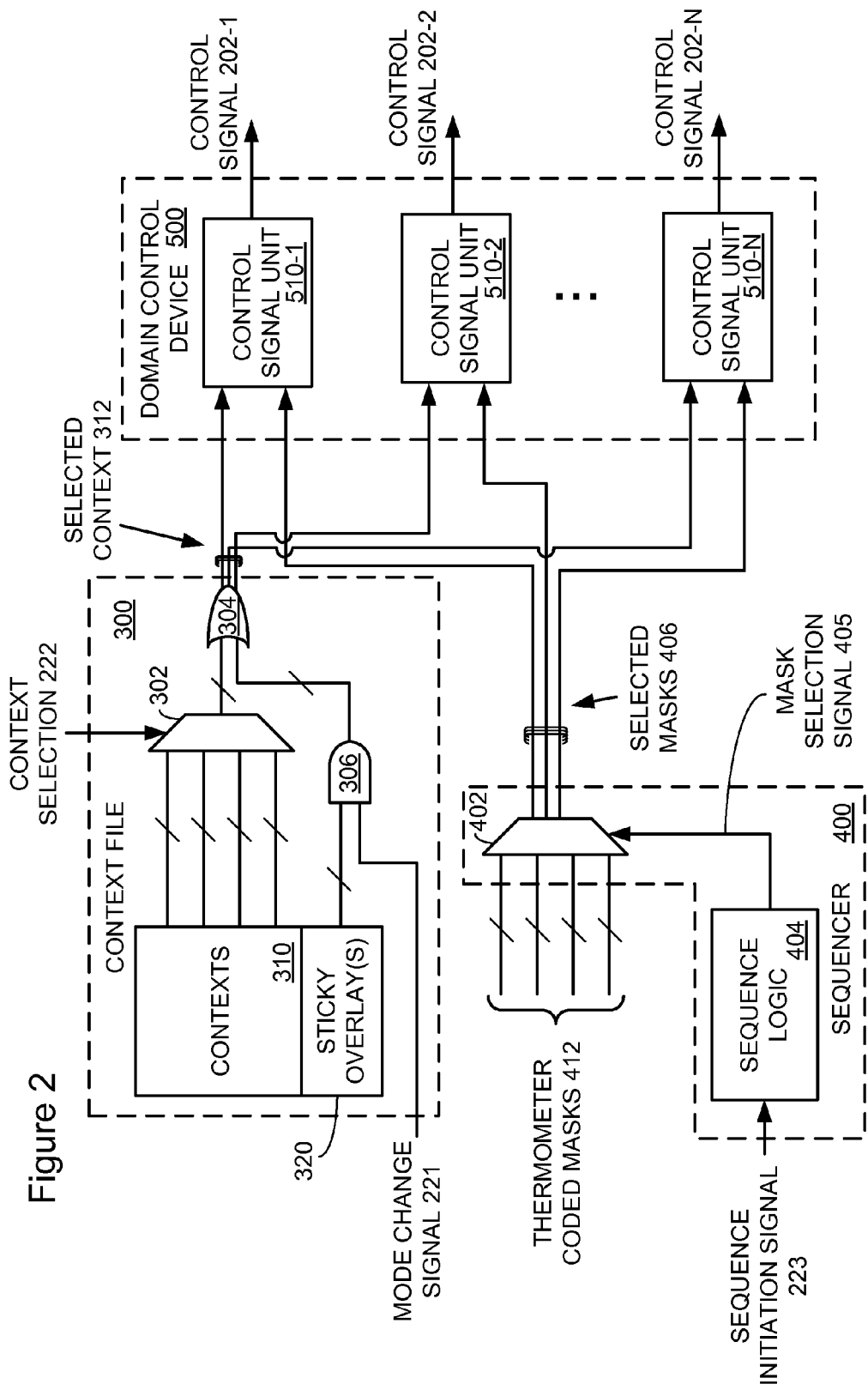
FIG. 2 is a block diagram example of the power manager shown in FIG. 1.

FIG. 2 is a block diagram example of the power manager 200 shown in FIG. 1. Referring to FIG. 2, the power manager 200 includes the context file 300 to store multiple contexts 310 corresponding to power modes of the electronic system 110. In some embodiments, the contexts 310 can identify a particular transition between power modes, e.g., based on both the current power mode and the future power mode of the electronic system 110. The context file 300 can pass a selected context 312 to the domain control device 500 for use in generating control signals 202-1 to 202-N.

The context file 300 can include a multiplexer 302 to select among the contexts 310 responsive to a context selection signal 222. In some embodiments, the context selection signal 222 can be provided to the context file 300 by the mode controller 220. As will be discussed below in greater detail, each context can include multiple bit slices that each can correspond to a control signal 202 for a particular domain or subsystem in the electronic system 110.

The context file 300 can include one or more sticky overlays 320 that, when selected, can be combined with a selected context, for example, with an OR gate 304, to override or ensure one or more of the bit slices within the select context 310 is active. Since the power manager 200 can be programmed and contexts 310 can be updated or added to the context file 300 via the power manager interface 210, the inclusion of sticky overlays 320 can ensure that particular control signals 202 are generated and the electronic system 110 performs operations corresponding to those control signals 202. For example, during wake-up operations, e.g., when the electronic system 110 is to transition to an active power mode, a sticky overlay 320 can be selected to ensure the microcontroller 116 is active regardless of the bit slices in the selected context 310. The context file 300 can include an AND gate 306 to pass the sticky overlay to the OR gate 304 based on a state of a mode change signal 221. For example, when the mode change signal 221 is high, the sticky overlay 320 can be passed to the OR gate 304. Conversely, when the mode change signal 221 is low, the sticky overlay 320 may not be passed to the OR gate 304.

The context file 300 can send selected context 312 to the domain control device 500, for example, from the output of the OR gate 304. The selected context 312 can be one of the contexts 310 selected according to the context selection signal 222 or a combination of a selected context and a sticky overlay 320 based on the mode change signal 221.

The domain control device 500 can include multiple control signal units 510-1 to 510-N that each can receive at least a portion of the selected context 312. In some embodiments, each control signal unit 510-1 to 510-N can receive a different bit slice of the selected context 312. The control signal units 510-1 to 510-N can generate corresponding control signals 202-1 to 202-N based on the portion of the selected context 312 they receive from the context file 300.

The power manager 200 includes a sequencer 400 to select among multiple thermometer coded masks 412 and pass selected masks 406 to the domain control device 500. The sequencer 400 includes a multiplexer 402 to receive the thermometer coded masks 412 and to select among the thermometer coded masks 412 responsive to a mask selection signal 405. The sequencer 400 can include sequence logic 404 to generate the mask selection signal 405 responsive to a sequence initiation signal 223, for example, from the mode controller 220. In some embodiments, the sequencer 400 can sequentially pass selected masks 406 to the domain control device 500. For instance, the sequencer 400 can pass a first mask 406 to the domain control device 500, and then after a delay, the sequencer 400 can pass another selected mask 406 to the domain control device 500. Embodiments of the sequencer 400 will be described below in greater detail.

The control signal units 510-1 to 510-N can receive the selected masks 406 from the sequencer 400 and generate corresponding control signals 202-1 to 202-N based on both the selected masks 406 and the selected context 312. In some embodiments, the selected masks 406 can indicate which bit slice of the selected context 312 is to be utilized by the domain control device 500 to generate a control signal 202-1 to 202-N. The timing of when the selected masks 406 are provided to the domain control device 500 can dictate when the control signals 202-1 to 202-N are sent to the electronic system 110 and thus when the electronic system 110 performs power mode transition operations responsive to the control signals 202-1 to 202-N. Embodiments of the domain control device 500 will be described below in greater detail.

Although FIG. 2 shows the power manager 200 being implemented with hardware circuitry, in some embodiments, the power manager 200 can be implemented in whole or in part, with one or more microcontrollers or other processing devices in the system 100.

Figure 3A:
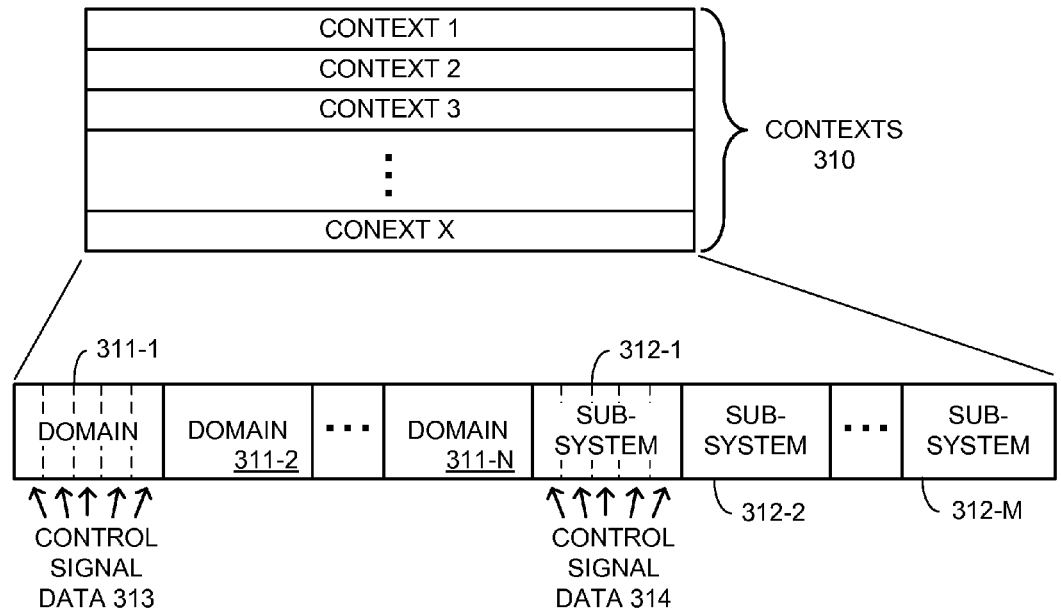
FIGS. 3A-3B are block diagram examples of the contexts shown in FIGS. 1 and 2.
Figure 3B:
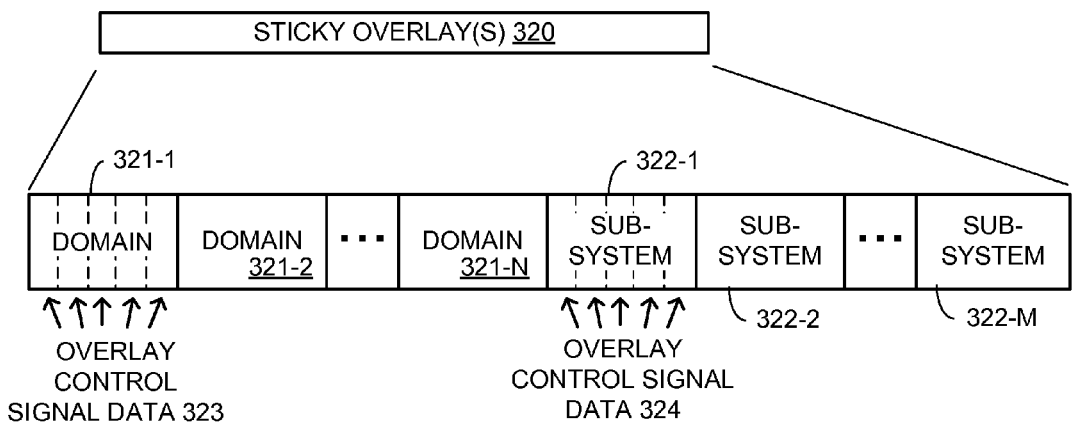

FIGS. 3A-3B are block diagram examples of the contexts shown in FIGS. 1 and 2. Referring to FIG. 3A, the context file 300 can include multiple contexts 310, such as contexts 1-X, which are shown as rows in the context file 300. The contexts 310 can include control signal data, or bit slices, that, when provided to the domain control device 500, can prompt the domain control device 500 to generate corresponding control signals 202.

The control signal data within the contexts 310 can be logically organized by domain 311-1 to 311-N and/or subsystem 312-1 to 312-M sections, which correspond to domains and subsystems that transition between power modes when a particular context is selected. For instance, a context 310 can be logically divided into columns that include control signal data corresponding to particular domain or subsystem. Subsystems can be physical portions of the electronic system 110 that are related, for example, through similar topology, or that work together to perforin operations for the electronic system 110. Domains can include sections of the electronic system 110 that share one or more common resources, such as a clock signal or a power supply. The subsystems and the domains can be any size, and can overlap each other.

Since a power mode transition for a particular domain or subsystem can involve multiple sequential operations, the domain 311-1 to 311-N and subsystem 312-1 to 312-M sections of the contexts 310 can each include control signal data for each operation to be performed. For example, domain 311-1 includes control signal data 313 that corresponds to different control signals 202 and operations to be performed by the electronic system 110. Similarly, subsystem 312-1 also includes control signal data 314 that corresponds to different control signals 202 and operations to be performed by the electronic system 110.

In some embodiments, programming of contexts 310 can be abstracted to a domain and/or subsystem level. The context programmers can define a power mode by indicating a state of the domains and/or subsystems in the electronic system 110, without having to define the sequential events that are performed to transition that domain and/or subsystem.

Referring to FIG. 3B, a sticky overlay 320 is shown having a similar organization as the contexts 310. The sticky overlay 320 can be logically organized by domains and/or subsystems, with each section including overlay control signal data. For instance, the domain section 321-1 can include overlay control signal data 323 and subsystem section 322-1 can include overlay control signal data 324. The sticky overlay 320 when selected by the power manager 200 can override the selected bit slices or sections of contexts 310. By organizing the sticky overlay 320 similarly to the contexts 310, simple logic, such as an OR gate 304, can be utilized to override bit slices of the contexts 310 with bit slices of the sticky overlay 320.

Figure 4:
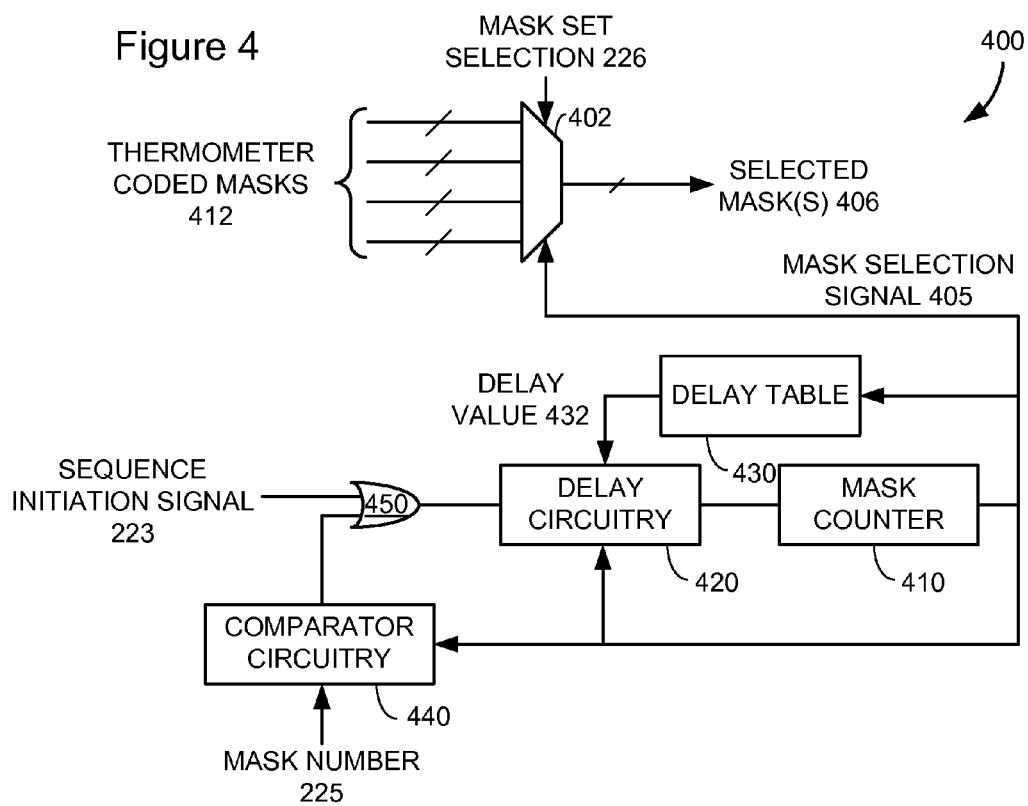
FIG. 4 is a block diagram example of the sequencer shown in FIGS. 1 and 2.

FIG. 4 is a block diagram example of the sequencer 400 shown in FIGS. 1 and 2. Referring to FIG. 4, the sequencer 400 includes a multiplexer 402 or other selection device, to receive one or more sets of thermometer coded masks 412. The multiplexer 402 can select a set of the thermometer coded masks 412 according to a mask selection signal 226, for example, from the mode controller 220.

The multiplexer 402 can select a mask 406 from the selected mask set based on a mask selection signal 405. The selected mask 406 can be provided to the domain control device 500 for use in generating one or more of the control signals 202-1 to 202-N. In some embodiments, the selected mask 406 can be provided to a particular control signal unit 510-1 to 510-N in the domain control device 500, and that particular control unit can generate a corresponding control signal 202 responsive to the selected mask 406 and a bit slice of the selected context 312.

The sequencer 400 can be initiated to generate the mask selection signals 405 responsive to a sequence initiation signal 223, for example, from the mode controller 220. When the sequence initiation signal 223 is asserted or set in a high position, the signal progresses through an OR gate 450 to delay circuitry 420. The delay circuitry 420, after a predetermined delay, can prompt a mask counter 410 to increment or decrement a mask selection signal 405. In some embodiments, the mode controller 220 can set the sequence initiation signal 223 back to a low position after a predetermined period of time.

The mask counter 410 can be an up-counter or a down-counter, for example, based on the type of operations to be performed by the power manager 200. In some embodiments, the mask counter 410 can implement an up-counter when the power manager 200 is prompting the electronic system 110 to enter a low power mode or a shutdown mode, and the mask counter 410 can implement a down-counter when the power manager 200 is prompting the electronic system 110 to wake-up from a low power mode or a shutdown mode.

The mask selection signal 405 can be provided to the multiplexer 402 for use in selecting a first one of the selected masks 406 from the set of thermometer coded masks 412. The mask selection signal 405 can also be fed back to comparator circuitry 440, a delay table 430, and the delay circuitry 420. The comparator circuitry 440 can compare the mask selection signal 405 with a mask number 225, for example, from the mode controller 220. When the mask selection signal 405 equals the mask number 225, indicating another mask is not to be selected by the sequencer 400, the comparator circuitry 440 outputs a low signal to the OR gate 450. When the mask selection signal 405 does not equal the mask number 225, indicating another mask is to be selected by the sequencer 400, the comparator circuitry 440 can output a high signal to the OR gate 450. The high signal from the comparator circuitry 440 can then be provided to the delay circuitry 420.

The delay table 430 can be populated with one or more delay values 432, which are indexable by the mask selection signal 405. The delay table 430 can utilize the mask selection signal 405 to locate a delay value 432 to provide to the delay circuitry 420. The delay circuitry 420 can delay prompting the mask counter 410 to increment or decrement the mask selection signal 405 for a time period associated with the delay value 432. Thus, when the delay circuitry 420 receives a signal from the comparator circuitry 440, indicating the sequencer 400 can select another mask 406, the delay circuitry 420 can delay prompting the mask counter 410 from generating another mask selection signal 405 for a time period associated with the delay value 432.

The time period associated with the delay value 432 can correspond to a time the electronic system 110 utilizes to perform at least one operation during a power mode transition. The sequencer 400 therefore can select masks 406 in a particular sequence and introduce delays in-between the mask selections, which correspond to a sequence of operations performed by the electronic system 110 during power mode transitions and the delays between performance of those operations. The delays introduced by the sequencer 400 can vary depending whether the power manager 200 performs operations to wake-up or shut down the electronic system 110. For example, the delay introduced by the delay values 432 can be based on which thermometer coded mask set is selected in response to the mask set selection signal 226 and/or whether the mask counter 410 is configured to increment or decrement the mask selection signal 405.

Figure 5:
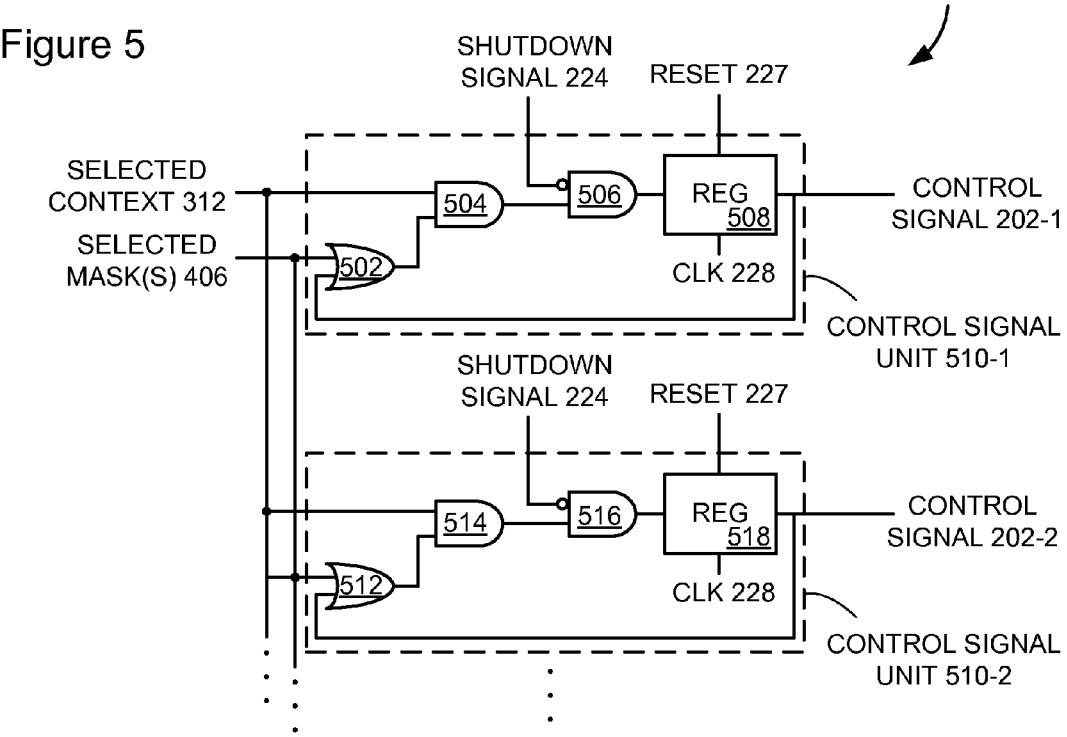
FIG. 5 is a block diagram example of the domain control device shown in FIGS. 1 and 2.

FIG. 5 is a block diagram example of the domain control device 500 shown in FIGS. 1 and 2. Referring to FIG. 5, the domain control device 500 includes multiple control signal units 510-1 to 510-N to generate control signals 202-1 to 202-N, respectively, responsive to the selected context 312 from the context file 300 and the select masks 406 from the sequencer 400.

The control signal unit 510-1 can include an OR gate 502 to receive at least one of the selected masks 406 from the sequencer 400, and includes an AND gate 504 to receive at least a bit slice of the selected context 312 from the context file 300. In some embodiments, each control signal unit 510-1 to 510-N can receive a different bit slice of the selected context 312 from the context file 300 and can receive different masks 406 from the sequencer 400. When the selected mask 406 is high, indicating the control signal unit 510-1 has been selected to generate control signal 202-1, the OR gate 502 passes the mask to the AND gate 504, and the AND gate 504 passes the bit slice of the selected context 312 as an output.

The control signal unit 510-1 can include a shutdown AND gate 506 to either pass the bit slice of the selected context 312 from the AND gate 504 or a shutdown signal 224, for example, from the mode controller 220, as an output. The shutdown AND gate 506 allows the power manager 200 the ability to direct the domain control device 500 to generate control signals 202-1 to 202-N that prompts the electronic system 110 to shutdown.

The control signal unit 510-1 can include a register 508 to receive the bit slice of the selected context 312 or the shutdown signal 224. The register 508 when prompted by the clock signal CLK 228 can output its received input as the control signal 202-1. The register 508 can also receive a reset signal 227, which can delete or reset a value stored by the register 508. In some embodiments, the register 508 can be a D-flip flop, which can pass a received input as an output responsive to a clock signal CLK 228.

The remaining control signal units 510-2 to 510-N in the domain control device 500 can include similar logic and/or components as the control signal unit 510-1. For example, control signal unit 510-2 includes OR gate 512, AND gates 514 and 516, and a register 518, which are similar to OR gate 502, AND gates 504 and 506, and register 508 discussed above in the control signal unit 510-1.

Figure 6:
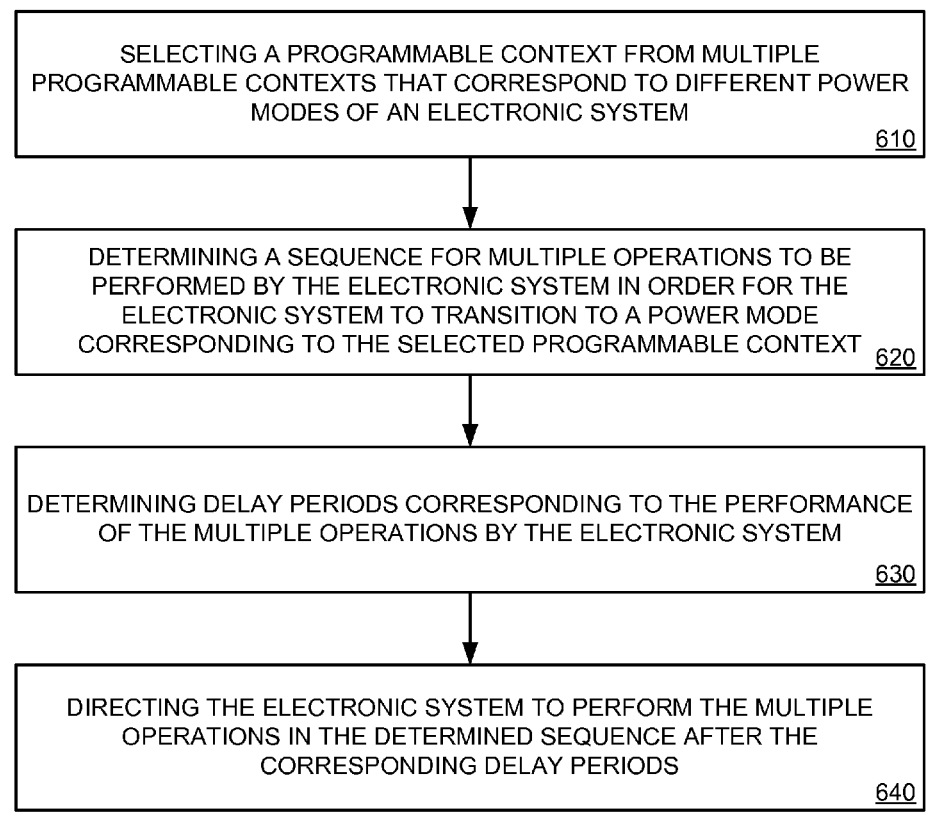
FIG. 6 is an example operational flowchart of the power manager according to embodiments of the invention.

FIG. 6 is an example operational flowchart of the power manager 200 according to embodiments of the invention. In a first block, the power manager 200 can be configured to select a programmable context from multiple programmable contexts that correspond to different power modes of an electronic system 110. The power manager 200 can include a context file 300 to store and select the programmable contexts responsive to signaling from the mode controller 220.

In a next block, the power manager 200 can be configured to determine a sequence for multiple operations to be performed by the electronic system in order for the electronic system to transition to a power mode corresponding to the selected programmable context. The power manager can include a sequencer 400 to select one or more masks 406 that can dictate the sequence the operations performed by the electronic system 110.

In a next block, the power manager 200 can be configured to determine delay periods corresponding to the performance of the multiple operations by the electronic system 110. In some embodiments, the delay periods can be determined by the sequencer 400 during the selection of the masks 406. The sequencer 400 can delay selecting the mask 406, which can correspondingly delay the performance of the operations performed by the electronic system 110.

In a next block, the power manager 200 can be configured to direct the electronic system 110 to perform the multiple operations in the determined sequence after the corresponding delay periods. The power manager 200 can include a domain control device 500 to generate control signals 202 based on the selected programmable context. These control signals, when provided to the electronic system 110, can prompt the electronic system 110 to perform the respective operations. The sequencer 400 can select masks 406 that direct the domain control device 500 to generate certain control signals 202 and provide them to the electronic system 110. By controlling the order and the timing of when the masks 406 are provided to the domain control device, the power manager 200 can control which control signals 202 are generated and when they are generated. Since the control signals 202 direct the electronic system 110 to perform corresponding operations, the control over which control signals are generated and when they are generated, allows the power manager 200 to control and sequence power mode transitions for the electronic system 110.

Figure 7:
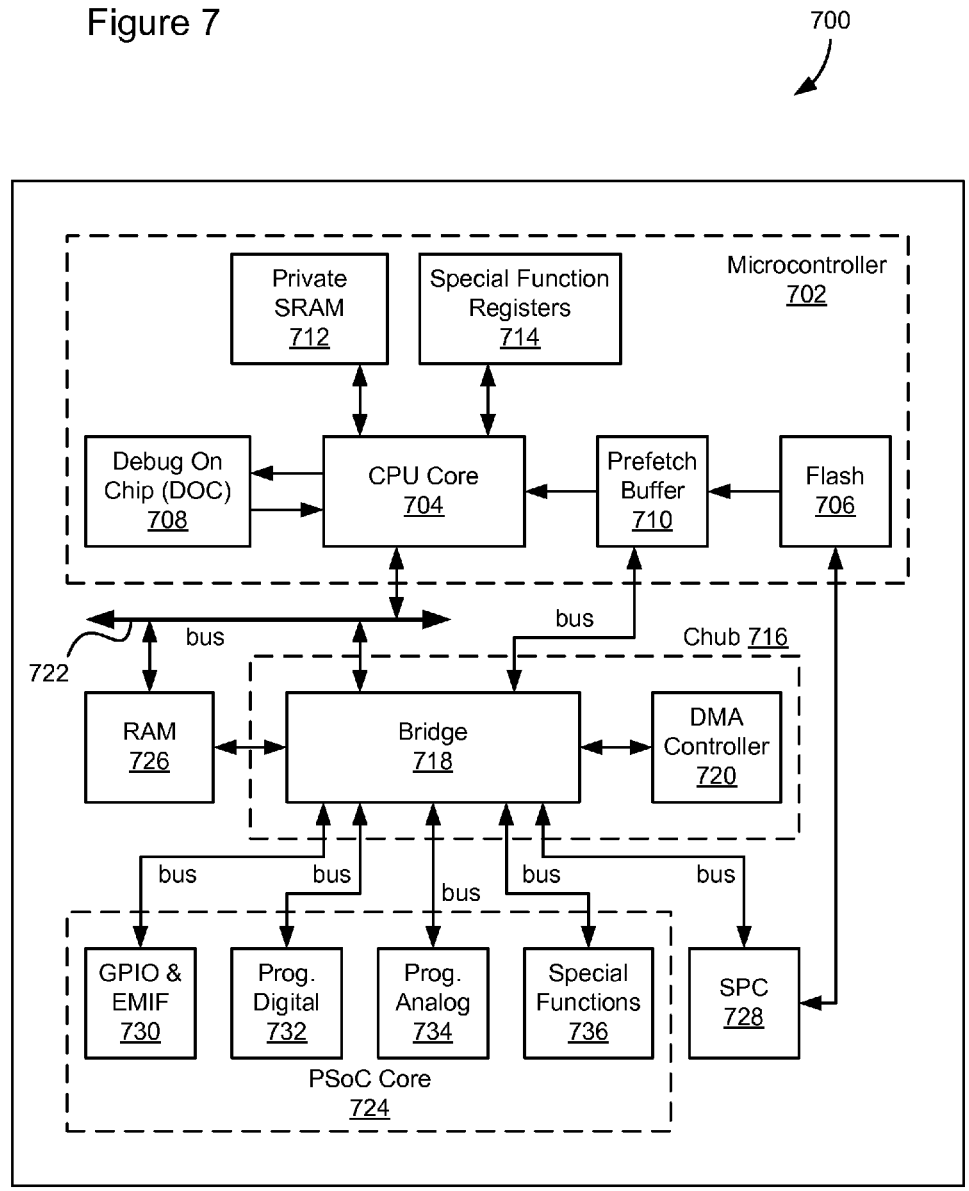
FIG. 7 is a block diagram example of a programmable system according to embodiments of the invention.

FIG. 7 is a block diagram example of a programmable system 700 according to embodiments of the invention. In various embodiments, the programmable system 700 may be similar or the same to all or a portion of the electronic system 110 of FIG. 1, including component blocks such as programmable digital blocks 112, programmable analog blocks 114, and microcontroller 116. In some embodiments, the power manager 200 can be included within or implemented by the programmable system 700.

Referring to FIG. 7, in some embodiments, the core architecture includes a microcontroller 702. The microcontroller 702 includes a CPU (central processing unit) core 704, flash program storage 706, DOC (debug on chip) 708, a prefetch buffer 710, a private SRAM (static random access memory) 712, and special functions registers 714. In an embodiment, the DOC 708, prefetch buffer 710, private SRAM 712, and special function registers 714 are coupled to the CPU core 704, while the flash program storage 706 is coupled to the prefetch buffer 710.

The core architecture may also include a CHub (core hub) 716, including a bridge 718 and a DMA (direct memory access) controller 720, that is coupled to the microcontroller 702 via bus 722. The Chub 716 may provide the primary data and control interface between the microcontroller 702 and its peripherals and memory, and a programmable core 724. The DMA controller 720 may be programmed to transfer data between system elements without burdening the CPU core 704. In various embodiments, each of these subcomponents of the microcontroller 702 and CHub 716 may be different with each choice or type of CPU core 704. The Chub 716 may also be coupled to shared SRAM 726 and an SPC (system performance controller) 728. The private SRAM 712 is independent of the shared SRAM 726 that is accessed by the microcontroller 702 through the bridge 718. The CPU core 704 accesses the private SRAM 712 without going through the bridge 718, thus allowing local register and RAM accesses to occur simultaneously with DMA access to shared SRAM 726. Although labeled here as SRAM, these memory modules may be any suitable type of a wide variety of (volatile or non-volatile) memory or data storage modules in various other embodiments.

In various embodiments, the programmable core 724 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 724 includes a GPIO (general purpose JO) and EMIF (extended memory interface) block 730 to provide a mechanism to extend the external off-chip access of the microcontroller 702, a programmable digital block 732, a programmable analog block 734, and a special functions block 736, each configured to implement one or more of the subcomponent functions. In various embodiments, the special functions block 736 may include dedicated (non-programmable) functional blocks and/or include one or more interfaces to dedicated functional blocks, such as USB, a crystal oscillator drive, JTAG, and the like.

The programmable digital block 732 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 732 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 704) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× oversampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 734 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 734 may support various analog functions including, but not limited to, analog routing, LCD drive JO support, capacitive sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

One of skill in the art will recognize that the concepts taught herein can be tailored to a particular application in many other ways. In particular, those skilled in the art will recognize that the illustrated embodiments are but one of many alternative implementations that will become apparent upon reading this disclosure.

The preceding embodiments are examples. Although the specification may refer to "an", "one", "another", or "some" embodiment(s) in several locations, this does not necessarily mean that each such reference is to the same embodiment(s), or that the feature only applies to a single embodiment.

The invention claimed is:

1. A system comprising:
a context file to store a plurality of contexts, each context of the plurality of contexts corresponding to a different power mode of an electronic system and each context of the plurality of contexts comprising bit slices; and
a domain control device including multiple control signal units each configured to receive from the context file a different portion of the bit slices of a context and to use the different portions of the bit slices of the context to generate corresponding control signals, each control signal corresponding to a power mode operation of the electronic system, wherein the electronic system is configured to transition to the power mode corresponding to the bit slices of the context responsive to the control signals.

2. The system of claim 1, wherein the contexts stored in the context file are programmable to correspond to different power modes of the electronic system.

3. The system of claim 1, further comprising a sequencer to direct the domain control device to provide the control signals to the electronic system in a particular sequence.

4. The system of claim 3, wherein the sequencer is configured to sequentially provide thermometer coded masks to the control signal units, and wherein the control signal units are configured to use the different portions of the bit slices as the control signals based on the thermometer coded masks.

5. The system of claim 4, wherein the sequencer includes:
a mask counter to sequentially increment or decrement a mask selection signal; and
a multiplexer to select which of the thermometer coded masks to provide to the domain control device responsive to the mask selection signal from the mask counter.

6. The system of claim 5, wherein the sequencer further includes:
a delay table populated with delay values indexable by the mask selection signal supplied to the delay table by the mask counter; and
delay circuitry to delay the increment or decrement of the mask selection signal by the mask counter according to delay values received from the delay table.

7. The system of claim 1, wherein at least one of the control signals is configured to prompt one or more portions of the electronic system to turn-on or turn-off a clock, retain data or a state, electrically isolate or de-isolate from the rest of the electronic system, or turn-on or turn-off a power domain.

8. The system of claim 1, wherein the context file includes one or more sticky overlays that when selected, are configured to override one or more of the different portions of the bit slices for the contexts.

9. The system of claim 1, wherein the different portions of the bit slices are configured to control different power domains of the electronic system or control different subsystems of the electronic system.

10. A method comprising:
selecting a programmable context from multiple programmable contexts that correspond to different power modes of an electronic system, wherein the selected programmable context comprises an array of bits;
determining a sequence of multiple operations to be performed by the electronic system in order for the electronic system to transition to a power mode corresponding to the selected programmable context; and using different portions of the array of bits of the selected programmable context to generate control signals, wherein each control signal corresponds to a different operation of the multiple operations, the control signals configured to direct the electronic system to perform the sequence of multiple operations.

11. The method of claim 10 further comprising an array of overlay bits configured to override one or more of the array of bits for the selected programmable context.

12. The method of claim 10 further comprises:

passing a first one of the control signals to the electronic system corresponding to a first portion of the selected programmable context, wherein the electronic system is configured to perform at least one of the multiple operations responsive to the first one of the control signals; and after a period of delay that allows the electronic system to perform the at least one of the multiple operations responsive to the first one of the control signals, passing a second one of the control signals to the electronic system corresponding to a second portion of the selected programmable context, wherein the electronic system is configured to perform at least another one of the sequence of operations responsive to the second one of the control signals.

13. The method of claim 12 further comprises:

selecting a first set of mask bits from a programmable thermometer coded mask set configured to control the sequence of multiple operations to be performed by the electronic system during the transition between power modes, wherein a timing of when the electronic system performs operations based on the first one of the control signals corresponds to the selection of the first set of mask bits; and selecting a second set of mask bits from the programmable thermometer coded mask set after the period of delay, wherein a timing of when the electronic system performs operations based on the second one of the control signals corresponds to the selection of the second mask bits.

14. The method of claim 10, wherein the programmable contexts are configured to generate control signals for one or more power domains in the electronic system.

15. The method of claim 10, wherein the multiple operations include one or more of turning-on or turning-off a clock domain, retaining data or a state, electrically isolating or de-isolating from the rest of the electronic system, or turning-on or turning-off a power domain.

16. A system comprising:

an electronic system having multiple operational power modes; and a power manager to select a programmable context corresponding to at least one of the multiple operational power modes, wherein the programmable context comprises bit slices and the power manager is configured to use different portions of the bit slices to generate different control signals for the electronic system, wherein each control signal corresponds to a different operation of the electronic system to transition the electronic system to an operational power mode corresponding to the selected programmable context.

17. The system of claim 16, wherein the power manager comprises:

a context file to store multiple programmable contexts corresponding to the multiple operational power modes of the electronic system; and a domain control device including multiple control signal units configured to use the different portions of the bit slice selected programmable context to generate the control signals.

18. The system of claim 17, wherein the different portions of the bit slice for the selected programmable context are arranged according to one or more power domains in the electronic system, and wherein the power manager further comprises a sequencer to direct the domain control device to provide the control signals to the electronic system in a particular sequence.

19. The system of claim 18, wherein the power manager further comprises a mode controller to select the programmable context from the context file, select programmable mask bits with the sequencer, and control a timing that the domain control device transmits the control signals to the electronic system based on when the programmable mask bits are provided to the domain control device.

20. The system of claim 16, wherein the power manager comprises an external interface to receive the programmable context and one or more programmable masks, wherein the electronic system is configured to convert one of the multiple operational power modes corresponding to the programmable context selected by the power manager through a sequence of operations, and wherein the power manager is configured to direct the electronic system to perform the sequence of operations based, at least in part, on the one or more programmable masks.

* * * * *